United States Patent [19]
Regner

[11] Patent Number: 5,228,743
[45] Date of Patent: Jul. 20, 1993

[54] CAM TRACK MOUNT FOR SUNROOF

[76] Inventor: Otto Regner, 5491 Winchester, Troy, Mich. 48098

[21] Appl. No.: 772,414

[22] Filed: Oct. 7, 1991

[51] Int. Cl.⁵ .......................................... B60J 7/047
[52] U.S. Cl. .................... 296/223; 296/216; 296/220; 296/221; 296/224
[58] Field of Search .............. 296/216, 220, 221, 223, 296/224

[56] References Cited

U.S. PATENT DOCUMENTS

| | | | |
|---|---|---|---|
| 4,602,815 | 7/1986 | Boots et al. | 296/216 X |
| 4,877,285 | 10/1989 | Huyer | 296/224 X |
| 4,893,869 | 1/1990 | Fuerst | 296/220 |
| 4,921,298 | 5/1990 | Reuber et al. | 296/223 x |
| 4,978,165 | 12/1990 | Schreiter et al. | 296/220 X |

FOREIGN PATENT DOCUMENTS 0265020 11/1987 Japan ................... 296/220

*Primary Examiner*—Dennis H. Pedder

[57] ABSTRACT

A vehicle sunrool assembly comprising a fixed fame assembly for securement to a vehicle roof in a position to extend alongside an opening in the roof and a panel for closing the opening. A panel mounting mechanism is provided for mounting the panel on the frame assembly for movement between adjacent positins within a sequence of positions including a closed position wherein the panel is supported in closing relation with the roof opening, a vent position wherein the panel is tilted upwardly and rearwardly above the opening and an open position wherein a substantial portion of the panel is disposed rearwardly of the roof opening. The panel mounting mechanism includes a track defining a curvilinear cam slot and an arm connected to the panel and guiding in the cam slot. The arm extends through the cam slot in a generally horizontal direction when the panel is in the lowered position and in a generally vertical direction when the panel is in the vent and open positions.

24 Claims, 5 Drawing Sheets

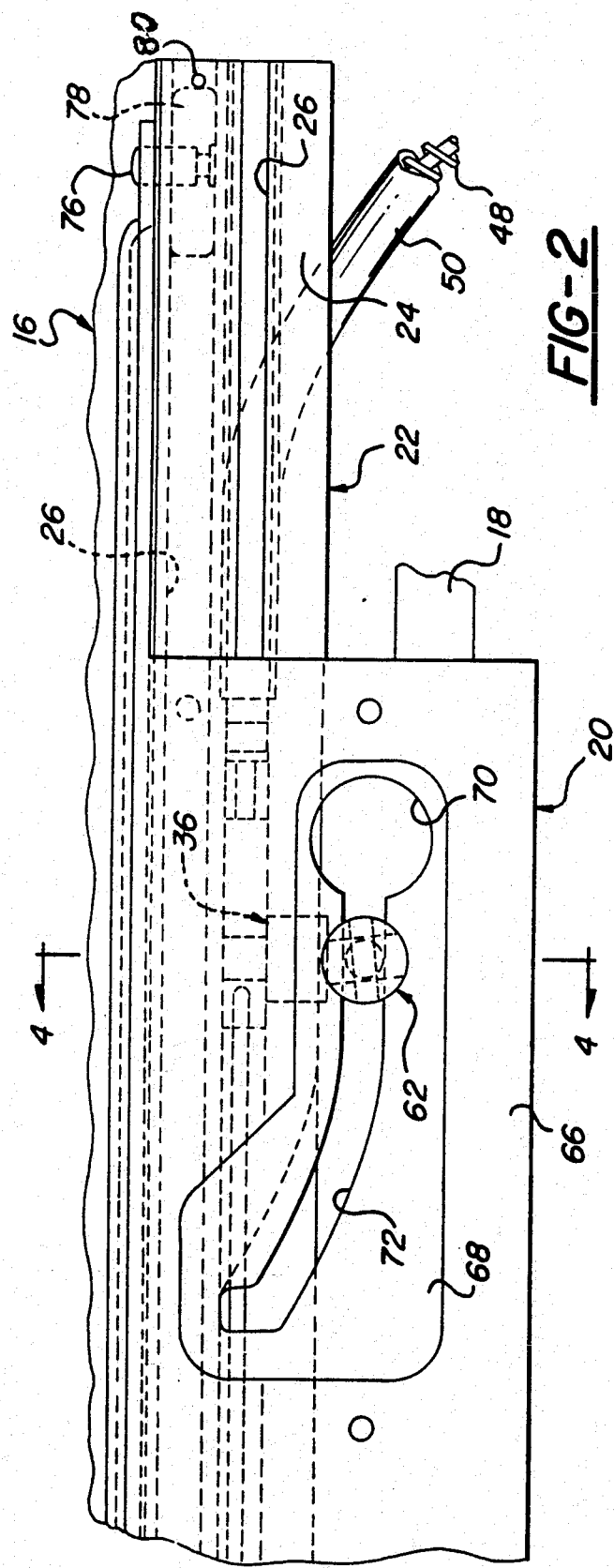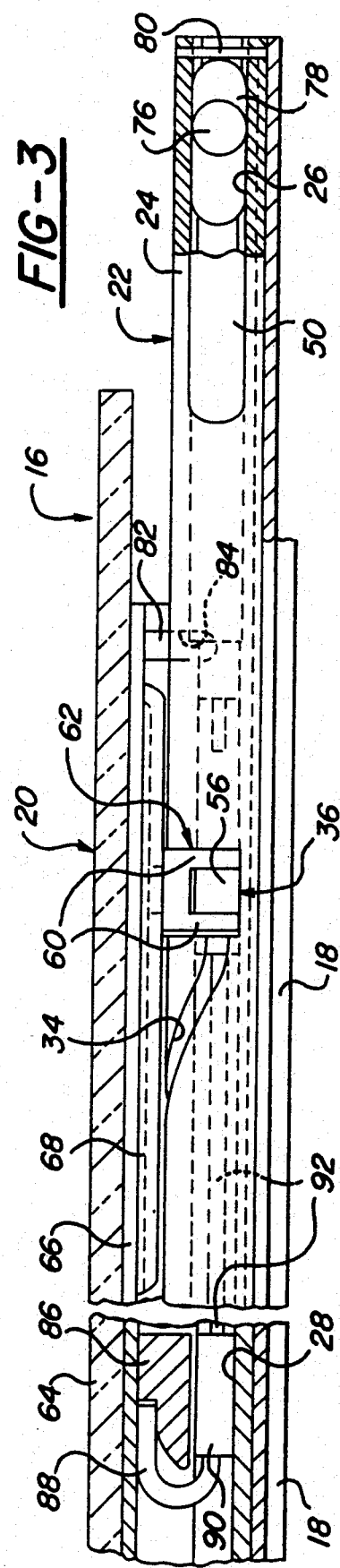

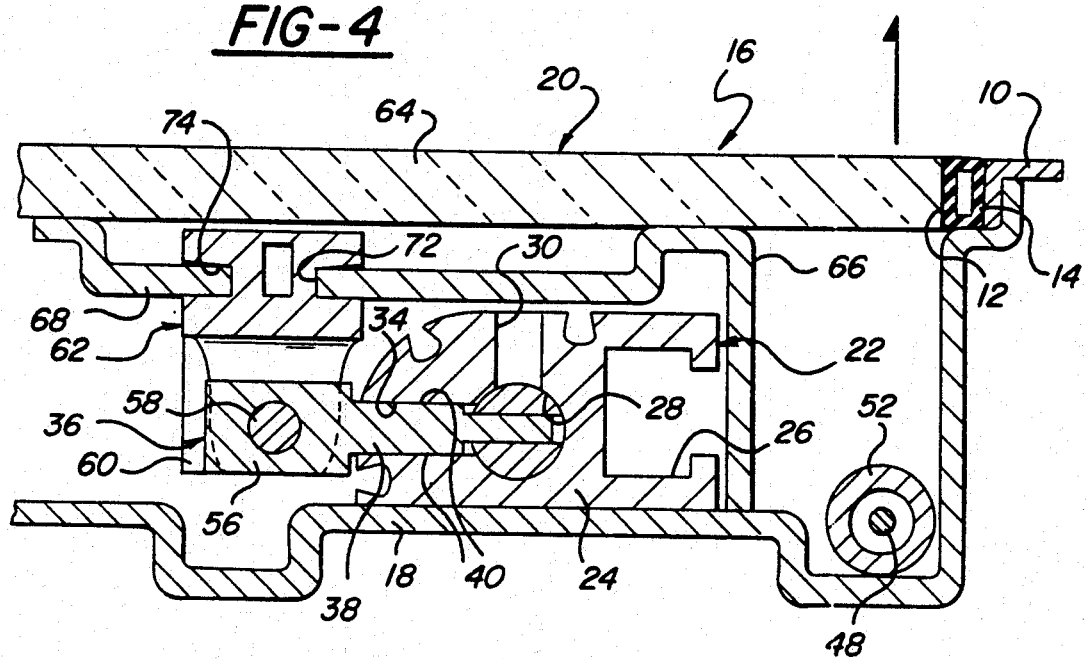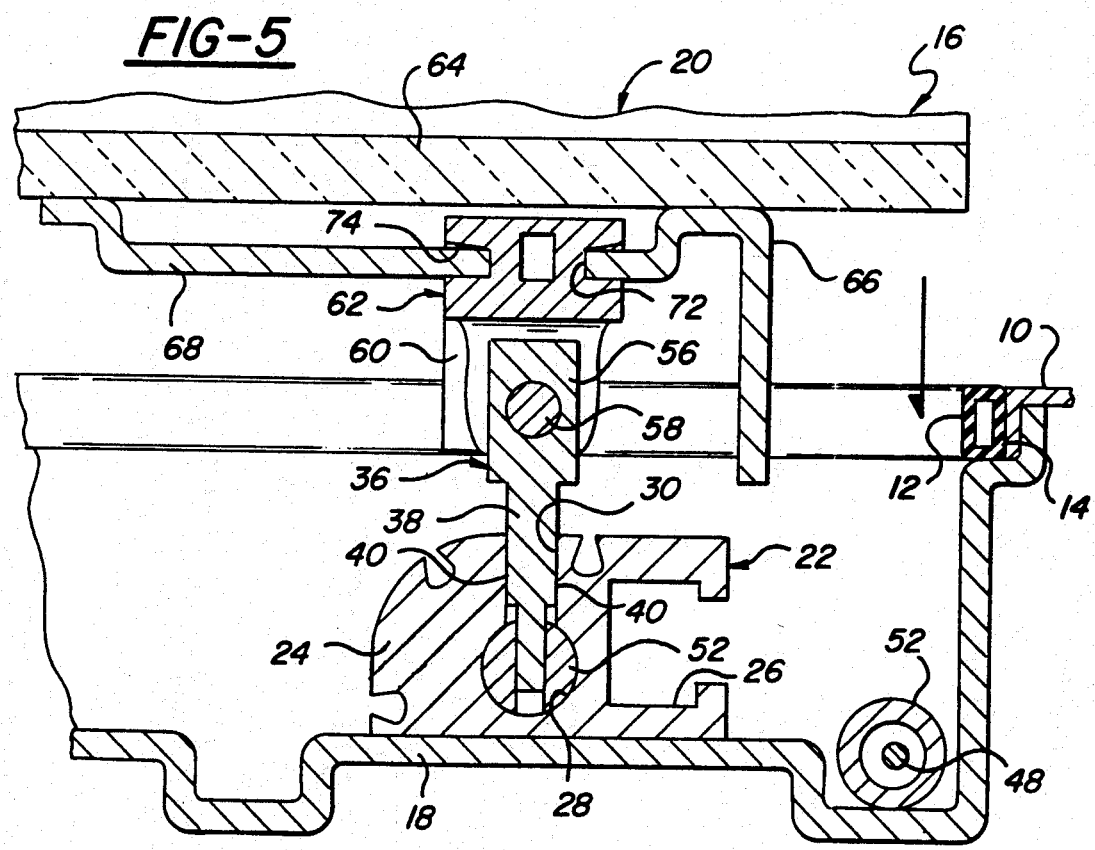

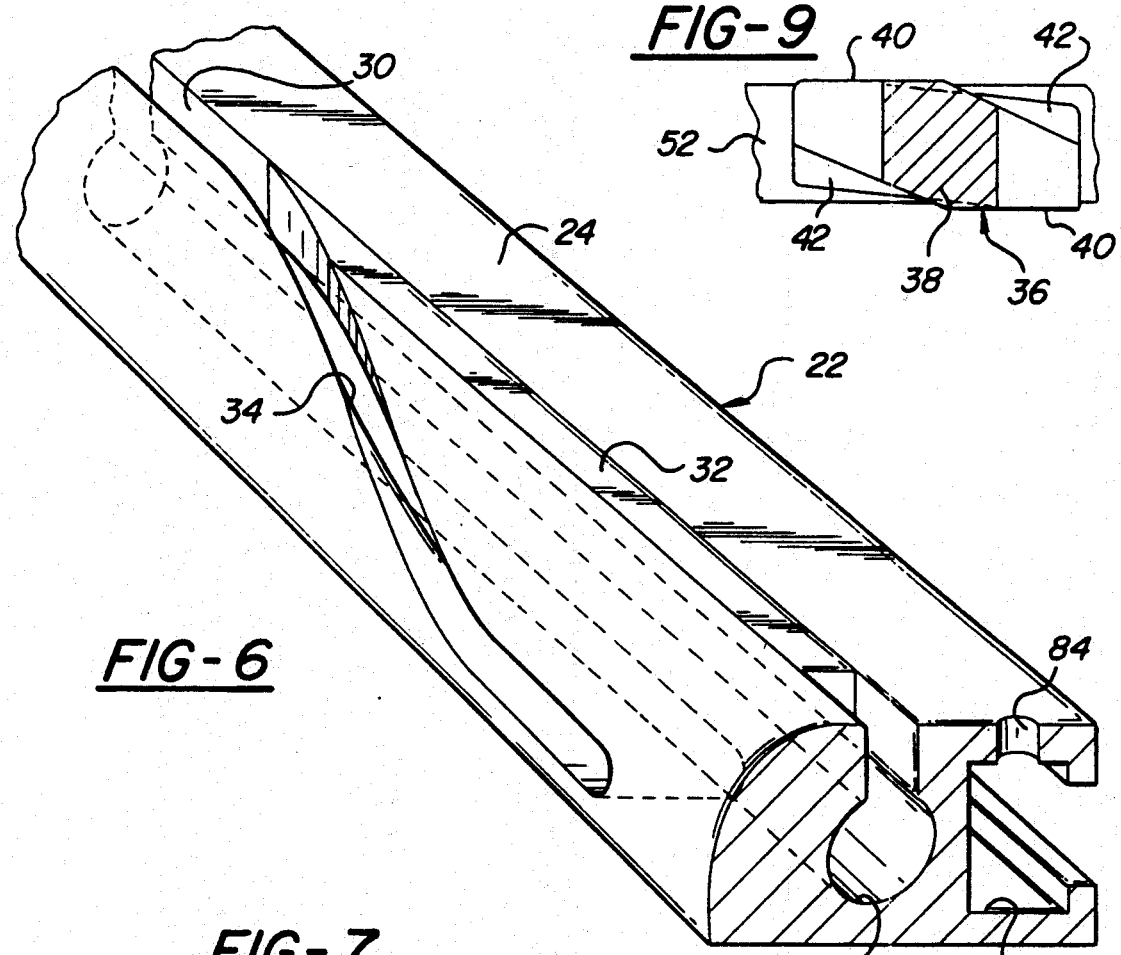

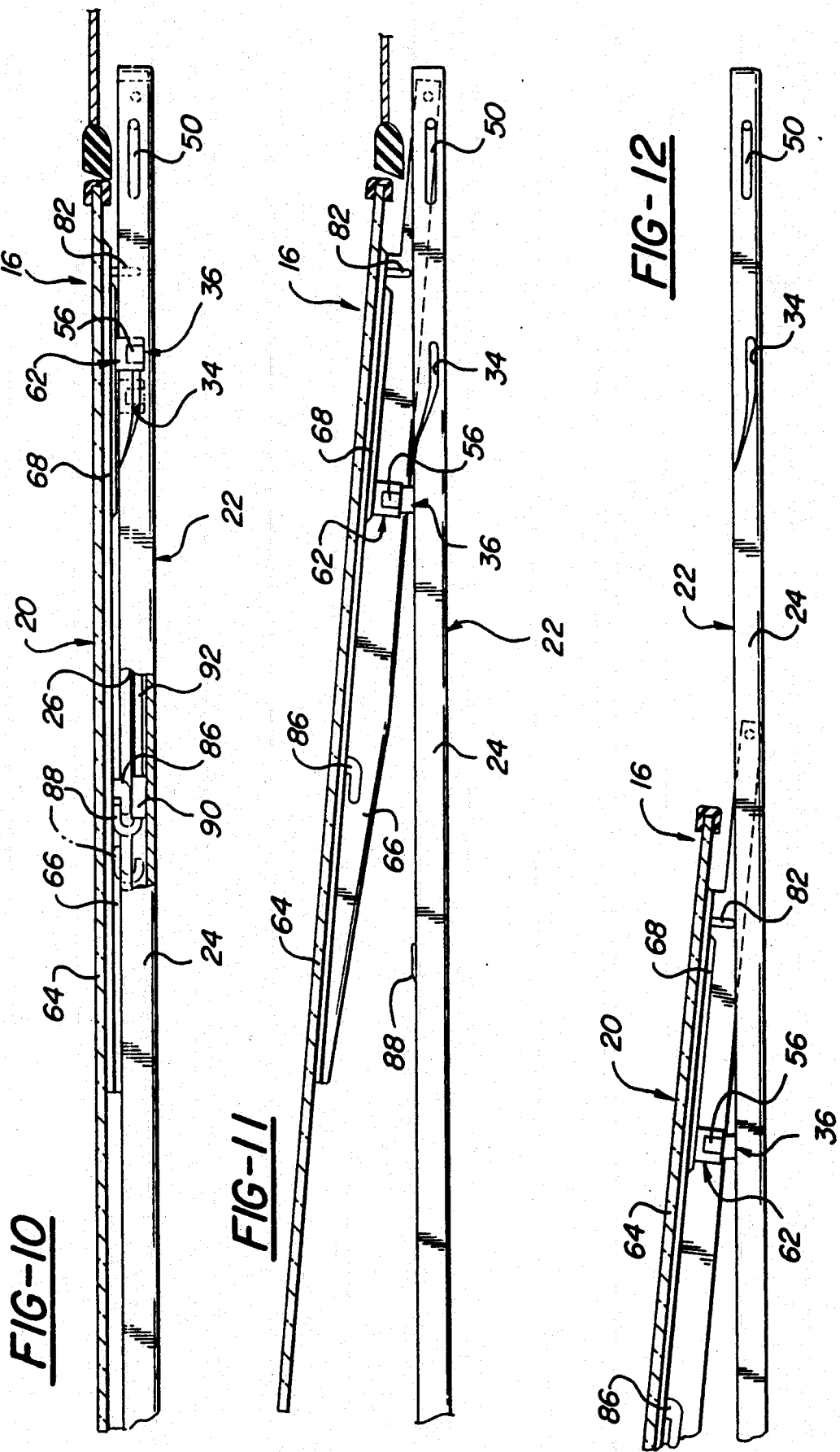

CAM TRACK MOUNT FOR SUNROOF

This invention relates to automotive vehicle sunroofs and more particularly to improvements in the mechanisms used to move sunroofs.

The present invention has particular applicability to automotive vehicle sunroofs of the so-called "spoiler" type. A spoiler sunroof is one that moves from a closed position with respect to a roof opening into an upwardly and rearwardly tilted vent position and then is moved into a fully open position with a generally rectilinear rearward movement so that in the fully open position the sunroof extends in upwardly and rearwardly tilted relation above a portion of the roof rearwardly of the roof opening. Other types of sunroofs also move from a closed position to an upwardly and rearwardly tilted vent position but the over the roof fully open position is unique to the spoiler type. Other types of sunroofs may have a fully open position but unlike the spoiler type the fully open position is below the roof rearwardly of the roof opening.

Spoiler-type sunroofs present a particular problem in the construction of the moving mechanism because the sunroof must be mounted at its forward portion in order to enable as much as possible to extend rearwardly over the roof when in a fully open position. In most instances the forward end of the sunroof is mounted for both pivoted and sliding movement, the problem comes in providing for the connections rearwardly of the forward end which should be capable of stably supporting the remainder of the sunroof not only in the fully open position but also in the vent and closed positions as well as of stably supporting the remainder of the sunroof during movements between these three positions. Moreover, these stable mountings must be accomplished in a cost effective manner. There is always a need to improve the cost effectiveness of the mounting mechanisms.

It is an object of the present invention to satisfy the above-described need. This objective is obtained by the principles of the present invention. However, these principles are applicable to other types of sunroof assemblies including the type in which the panel assembly is disposed below the roof in its full open position rather than above as in the spoiler type. Consequently, in its broadest aspects the principles of the present invention contemplate the provision of a vehicle sunroof assembly which comprises a fixed frame assembly for securement to a vehicle roof in a position to extend alongside an opening in the roof and a panel assembly for closing the opening. A panel mounting mechanism is provided for mounting the panel assembly on the frame assembly for movement between adjacent positions within a sequence of positions including a closed position wherein the panel assembly is supported in closing relation with the roof opening, a vent position wherein the panel assembly is tilted upwardly and rearwardly above the opening and an open position wherein a substantial portion of the panel assembly is disposed rearwardly of the roof opening. A panel moving mechanism is mounted on the frame assembly for longitudinal movement between adjacent positions within a sequence of corresponding positions so as to move the panel assembly between adjacent positions of the sequence of positions thereof in response to the movement of the moving mechanism between corresponding adjacent positions thereof. The panel mounting mechanism includes a pair of longitudinally-extending cam tracks and arms operatively connected with the panel assembly and the panel moving mechanism in cooperation with the cam tracks so that the arms are moved between lowered and raised positions to effect the movement of the panel assembly between the closed and vent positions thereof during the movement of the moving mechanism between adjacent positions corresponding to the closed and vent positions of the panel assembly.

In its more specific aspects as applied specifically to the spoiler type of sunroof assembly, the principles of the present invention contemplate the provision of a fixed frame assembly for securement to a vehicle roof in a position to extend alongside an opening in the roof and a panel assembly for closing the opening. A moving mechanism is mounted for longitudinal movement with respect to said frame assembly between locking and first positions, between first and second positions, and between second and third positions. A forward portion of the panel assembly is mounted on the frame assembly for pivotal movement about a transverse axis and for longitudinal movement and a rearward portion of the panel assembly has a fixed locking structure fixed thereon. A movable panel locking mechanism is connected with the moving mechanism for movement thereby between locking and releasing positions with respect to the fixed locking structure in response to the movement of the moving mechanism between the locking and first positions thereof. A panel mounting and movement effecting mechanism is operatively connected with the moving mechanism and the panel assembly for (1) effecting movement of the panel assembly (A) from a closed position with respect to the roof opening to an upwardly and rearwardly tilted vent position above the roof opening in response to the movement of the moving mechanism from the first position thereof to the second position thereof and (B) from the vent position into the closed position thereof in response to the movement of the moving mechanism from the second position thereof into the first position thereof and (2) effecting movement of the panel assembly (A) from the vent position thereof into an upwardly and rearwardly tilted open position above the roof in response to the movement of the moving mechanism from the second position thereof to the third position thereof and (B) from the open position into the vent position in response to the movement of the moving mechanism from the third position thereof to the second position thereof. The panel mounting and movement effecting mechanism includes a pair of longitudinally-extending cam tracks and arms operatively connected with the moving mechanism and the panel assembly in cooperating relation with the cam tracks so that the arms are moved between lowered and raised positions to effect the movement of the panel assembly between the closed and vent positions thereof during the movement of the moving mechanism between the first and second positions thereof.

Another object of the present invention is the provision of a sunroof assembly of the type described which is simple in construction, effective in operation and economical to manufacture and maintain.

These and other objects of the present invention will become more apparent during the course of the following detailed description and appended claims. The invention may best be understood in conjunction with the attached drawings wherein an illustrative embodiment is shown.

In the drawings:

FIG. 2 is an enlarged fragmentary top plan view of a forward left-hand corner portion of the sunroof assembly shown in FIG. 1;

FIG. 3 is a side elevational view of the structure shown in FIG. 2 with certain parts broken away for purposes of clearer illustration;

FIG. 4 is an enlarged fragmentary sectional view taken along the line 4—4 of FIG. 2 showing the transparent panel of the roof assembly in its closed position;

FIG. 5 is a view similar to FIG. 4 showing the panel in an upwardly and rearwardly tilted position;

FIG. 6 is a fragmentary perspective view of a portion of a guide rail showing the formation of the forward end portion of the cam slot therein;

FIG. 7 is a top plan view of an assembly of an arm and cylindrical member;

FIG. 8 is a top plan view of the assembly shown in FIG. 7;

FIG. 9 is a fragmentary sectional view taken along the line 9—9 of FIG. 7;

FIG. 10 is a vertical sectional view through the panel assembly showing the left-hand guide rail and illustrating the panel assembly in its closed position;

FIG. 11 is a view similar to FIG. 10 showing the panel assembly in its vent position; and FIG. 12 is a view similar to FIG. 12 showing the panel assembly in its open position.

Figure 1:
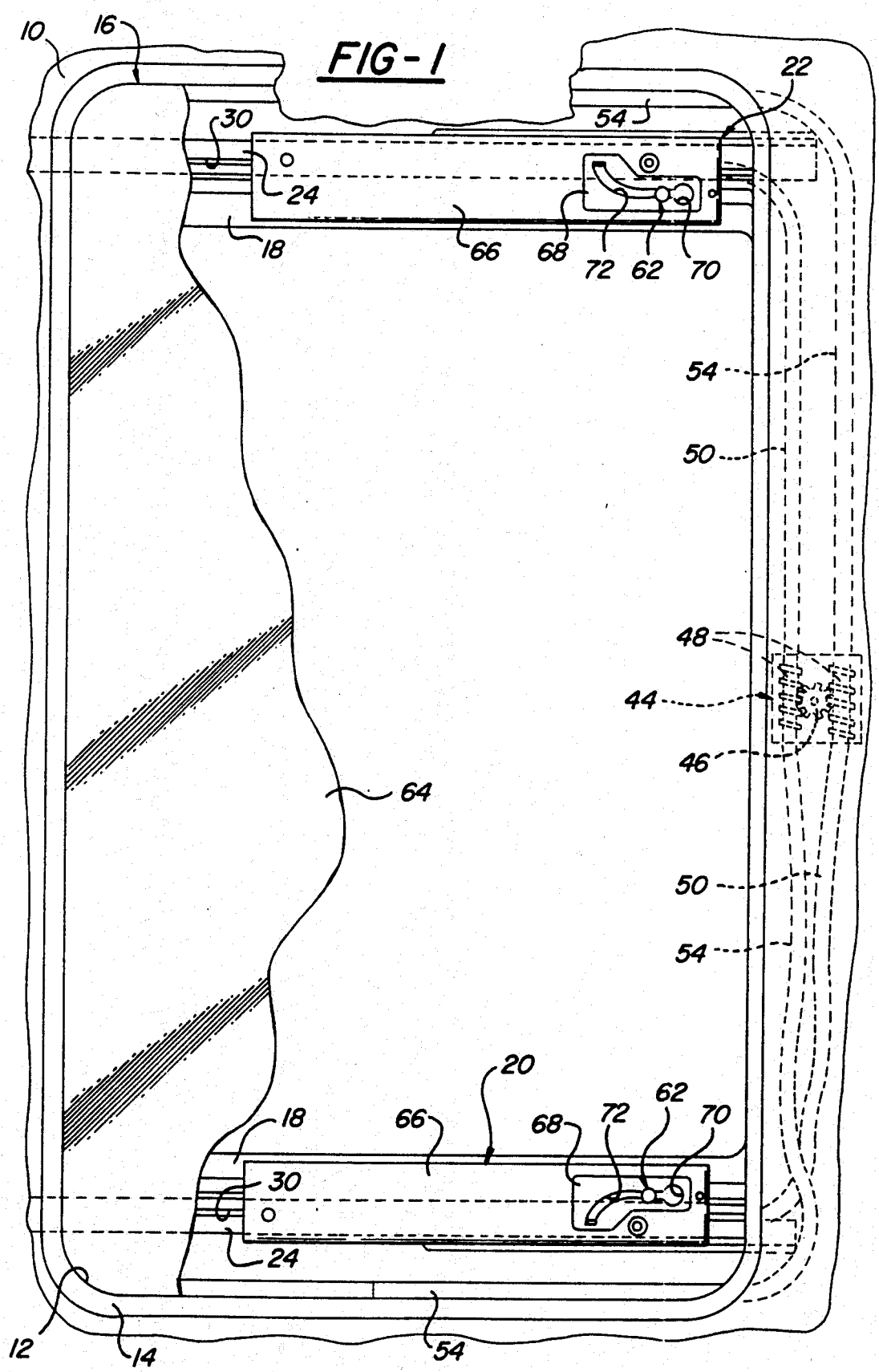
FIG. 1 is a fragmentary top plan view of a vehicle roof showing a sunroof assembly embodying the principles of the present invention mounted in operative relation with an opening in the roof, and with a portion of the transparent roof panel removed for purposes of clear illustration.

Referring now, more particularly, to the drawings there is shown in FIG. 1 a portion of a automotive vehicle roof 10 having an opening 12 formed therein which is defined by a peripheral seal 14. Mounted on the vehicle roof in cooperating relation with the opening 12 defined by the peripheral seal 14 is a sunroof assembly, generally indicated at 16, embodying the principles of the present invention. The sunroof assembly 16 includes a peripheral frame assembly 18 which is constructed in accordance with conventional practices relating to spoiler-type sunroof assemblies. In brief, the frame assembly 18 is essentially a peripheral frame which is mounted below the vehicle roof 10 so as to extend longitudinally alongside the opening 12 and laterally forwardly thereof as well as rearwardly thereof.

The present invention is more particularly concerned with the construction of a panel assembly, generally indicated at 20, which is provided for closing the opening 12 and a mounting mechanism, generally indicated at 22, which is connected between the frame assembly 18 and the panel assembly 20 for mounting the panel assembly 20 for movement between adjacent positions within a sequence of positions which includes a closed position in which the mounting mechanism 22 supports the panel assembly 20 in closing relation with the roof opening 12, a vent position in which the mounting mechanism 22 supports the panel assembly 20 in an upwardly and rearwardly tilted relationship above the roof opening 12 and an open position wherein the mounting mechanism 22 supports the panel assembly 20 in an upwardly and rearwardly tilted relation rearwardly of the forward end of the roof opening 12 above the roof 10.

As shown, the mounting mechanism 22 includes a pair of laterally spaced longitudinally extending guide rails 24. As best shown in FIG. 1, the guide rails are mounted in fixed relation on the longitudinally extending portions of the frame assembly 18, in mirror image relationship with respect to one another. As best shown in FIGS. 4–6, each guide rail is in the form of an extrusion having a longitudinal guide groove 26 formed in an side thereof which opens laterally outwardly in a horizontal direction and a cylindrical opening 28 disposed in horizontally spaced parallel relation with the guide groove 26. The upper periphery of the cylindrical opening 28 communicates with a slot 30 which opens laterally upwardly throughout the extrusion. As shown in FIG. 6, a bar 32 is suitably fixed within a forward portion-of each slot 30 and a curved slot portion 34 is milled in the bar 32 and the adjacent portion of the guide rail 24 forwardly from the slot 30 so as to curve from a vertically upwardly extending position to a horizontally inwardly extending position and then horizontally to a termination. The milled slot portion 34 forms a forward continuation of the straight slot 30 in the extrusion and the two slot portions 30 and 34 together constitute a longitudinally continuous cam slot defined by parallel cam track surfaces provided by the guide rails 24. As shown, the cam track surfaces at the forward end of the slot 34 are straight flat surfaces disposed in generally parallel horizontal planes while the rearward majority of the track surfaces at the rearward end of the slot 30 are flat parallel surfaces disposed generally vertically with curved surfaces extending therebetween.

Mounted within each of the cam slots 30, 34 is a mounting and movement effecting arm, generally indicated at 36. Each ar 36 includes an intermediate portion 38 which is adapted to be disposed in longitudinal sliding relation between the surfaces defining the associated cam slots 30, 34. As best shown in FIG. 9, each intermediate arm portion is shaped to provide parallel leading and trailing flat slot engaging surfaces 40 and leading and trailing curved slot engaging surfaces 42, the leading flat surface 40 intersecting with the trailing curved surface 42 and vice versa. When each arm 36 is moved rearwardly from the forward end of the cam track 34, both the leading and trailing flat surfaces 40 will be engaged with the flat surfaces of the cam track 34. As each arm 36 is moved rearwardly, the upper flat surface 40 moves out of engagement with the upper flat surface of the cam track and the lower curved surface 42 moves into engagement with the initial part of the lower curved surface of the cam track 34. Thereafter, the upper curved surface 42 is progressively engaged with the upper curved surface of the cam track 34 until both curved surfaces are in engagement. This movement continues as the arm 36 is moved rearwardly until the reverse situation takes place as the arm 36 is moved from the rearward transition of the curved portion of the cam track 34 into the rearward straight portion of the cam track 30.

In the preferred embodiment shown, the arms 36 preferably not only serve to mount the intermediate portion of the panel assembly 20 on the frame assembly 18 but in addition provide a motion transmitting effect as well. In this regard it will be noted from FIG. 1 that a drive unit, generally indicated at 44, of a conventional sunroof panel moving mechanism is mounted on the frame assembly 18 below the roof at a position forwardly of the central forward edge of the roof opening 12. Mechanisms of this type are well known in the prior art and may be either manually operated or power operated as, for example, in accordance with the disclosure contained in U.S. Pat. No. 4,531,777, the disclosure of which is hereby incorporated by reference into the present specification. A particularly desirable power-operated assembly of this type is disclosed in my copending application Ser. No. 07/588,822 filed Sep. 27, 1990 entitled, "Improved Motor-Driven Assembly and Control for A Sunroof," the disclosure of which is also incorporated herein by reference.

As shown, the driving unit 44 includes a driving gear 46 which is rotatably mounted about a vertical axis and has the peripheral gear teeth disposed in meshing relation at opposite sides with a pair of spiral flexible cables 40 so that as the drive gear 46 is turned in one direction or the other, the cables 48 will be moved along their axes in opposite directions. Each of the guide rails 24 has a forward inner portion removed to enable one end of a tube 50 to be mounted in longitudinally aligned relation with the central opening 28. Each tube 50 extends forwardly from the cylindrical opening 28 and curves laterally inwardly so as to extend laterally to the central drive unit 44. The driven portion of each spiral cable 48 extends through the associated tube 50 and into the associated central opening 28 for longitudinal movements in opposite directions therein. The rearward end of each spiral cable 48 is connected with the forward end of a cylindrical member 52 slidably mounted within the associated opening 28. The connection shown is a fixed one, although it may be a swivel connection, if desired. The opposite free end of each spiral cable 48 is guided within a tube 54 which extends laterally from the unit 44 and then is curved rearwardly and supported within the longitudinally extending portion of the frame assembly 18.

The central portion of each cylindrical member 52 is formed with an aperture within which an inner end portion of each arm 36 is rigidly fixedly mounted as by welding, or the like. Each arm 52 also includes an outer end portion 56 which is apertured fore and aft to receive a pivot pin 58 (see FIGS. 4 and 5) which likewise extends between a pair of longitudinally spaced lugs 60 formed in depending relation on a slide member, generally indicated at 62. The slide members 62 are operatively slidably connected with the panel assembly 20.

To this end, the panel assembly 20 includes a panel 64 of a size to fit within the opening 12 of the peripheral seal 14. It will be understood that the panel 64 could engage the top of a peripheral seal, rather than within the same as shown, or the engagement could be a combination of both. Preferably the panel 64 is formed of a transparent material, although it may be opaque, if desired. Fixed to the lower surface of the panel 64 along opposite sides thereof are angular mounting plates 66. The horizontal portion of each plate includes a depressed portion 68 formed with a circular opening 70 having a guide slot 72 of generally curved L-shaped configuration extending longitudinally rearwardly therefrom and then laterally outwardly to an opposite rearward termination. As best shown in FIGS. 2, 4 and 5, each slide member 62 is of a size to fit upwardly within the circular opening 70 and has a annular groove 74 therein for receiving the opposite portions of the depressed plate portions 68 defining the slot 72. The slide members 62 slidably move within the slots 72 to enable the arms 36 to have relative longitudinal and lateral movements with respect to the panel assembly 20 during the movement of the arms 36 within the forward slot portions 34. During this movement, the arms 36 move between lowered and raised positions enabling the panel assembly 20 to be tilted about a forward mounting. To accommodate this tilting movement, the axis of the pivot pin 58 extends fore and aft in parallel relation to the panel 64 at all times. In order to accomplish the forward mount of the panel assembly 20, the vertical leg of each mounting plate 66 extends forwardly and is apertured to pivotally receive a laterally extending pin 76 fixed to a mounting member 78 slidably mounted within the associated groove 26. To limit the extent of forward movement of the panel assembly 20, the forward surface of each mounting member 78 engages the rear surface of a pin 80 fixed vertically to the associated guide rail within the forward end of the associated groove 26 in a position as shown in FIGS. 2 and 3. In order to control the rearward movement of the panel assembly 20, a pin 82 is fixed to the forward portion of the horizontal leg of each mounting plate 66 in depending relation thereto. Each pin 82 is adapted to enter an opening 84 formed in the upper wall of the associated guide rail 24 when the panel assembly 20 is moved between its vent and closed positions.

In addition, as best shown in FIG. 3, a locking element 86 is fixed in depending relation to the underside of the horizontally extending leg of each mounting plate 66 in a rearward portion thereof. Each fixed locking element 86 is in the form of a plate which is adapted to enter within the cam slot 30 when the panel assembly 20 moves between its vent and closed positions. As shown, each fixed locking element 86 includes a rearward extension having an upwardly facing tapering locking surface thereon which is adapted to engage within a forwardly opening C-shaped locking hook 88 forming a part of a locking mechanism which is movable by the moving member 52. As shown, each C-shaped locking hook 88 is mounted within the rearward portion of the associated cam 30 slot so that its upper forwardly extending leg will engage the locking surface of the associated fixed locking element 86. The lower leg of each C-shaped locking hook 88 is fixed to a cylindrical member 90 which is slidably mounted within the associated cylindrical opening 28. As shown, each member 90 is swivelly mounted with the rear end of a rod 92, the forward end of which is fixed within the rearward end of the associated cylindrical member 52.

OPERATION

The operation of the present invention will be described beginning with the panel assembly 20 in its closed position as shown in FIGS. 1-4 and 10 and with the locking hooks 88 disposed in their locked position with respect to the fixed locking elements 86. In this condition, the cylindrical moving members 52 are disposed within the cylindrical openings 28 in their forwardmost positions, the arms 36 extend horizontally laterally through the forward ends of the cam slots 34 with the slide members 62 within a forward longitudinally extending portion of the curved slots 72. In addition, the forward mounting members 78 are disposed in forwardly butting relation with the limiting pins 80 and the pins 82 are extended through the openings 84. When the actuating unit 44 is actuated to move the cylindrical members 52 from their forward locking positions rearwardly a short distance, the cylindrical members 52 first move into a first position. During this movement, the arms 36 are moved through the initial horizontal section of the cam slots 36 and the slide members 62 are moved longitudinally through the longitudinal forward end portions of the curved L-shaped slots 72. The panel assembly 20 is positively retained against rearward movement out of its closed position by the engagement of pins 82 within openings 84 so that the only result of the initial movement of the cylindrical moving members 52 from their locking positions into their first positions is to move the C-shaped hooks 88 rearwardly into a releasing position with respect to the fixed locking elements 86 on the panel assembly 20. This releasing position is shown in dotted lines in FIG. 10.

In this position, the rearward curved surfaces 42 of the arms 36 are in engagement with the initial portion of the lower curved surfaces of the cam slots 34 so that additional rearward movement from the first position will effect a movement of the arms 36 from their horizontally inwardly extending lowered positions into a vertically upwardly extending raised position as they move through the slots 34 toward the beginning of the straight cam slot 30 wherein the rearward straight surfaces 40 engage the straight surfaces of the cam track defining the remainder of the cam slots 30. This position of the cylindrical members 52 constitutes a second position thereof and during this movement from the first position to the second position the panel assembly 20 is pivoted upwardly about the pivot pin 76 as the slide members 62 slide rearwardly through the curved L-shaped slots 72 which extend laterally at the end of this movement. The curved L-shaped slots 72 enable the slide members 62 to have both a relative rearward longitudinal movement as well as a laterally outward movement with respect to the panel assembly 20 as the movement of the cylindrical moving members 52 take place from the first position to the second position. In addition, pins 82 are moved upwardly out of openings 84. The vent position assumed by the panel assembly is shown in FIG. 11.

The continued rearward movement of the cylindrical members 52 within the cylindrical openings 28 will carry with it the mounting arms 36 in their upwardly extending raised positions through the cam slots 30. Since the slide members 62 are blocked from relative longitudinal movement within the laterally extending rearward ends of the slots 72, this movement of the arms 36 is transmitted as a rearward movement of the entire panel assembly 20. The rearward movement of the arms 36 carries the entire panel assembly 20 longitudinally rearwardly including the forward portion thereof pivotally connected with the mounting members 78. Since the panel assembly 20 is supported at its forward end by the pivot pin 76 and at its intermediate section by the slide members 62 and each of these members is guided for rectilinear movement rearwardly, the entire panel assembly 20 is moved rectilinearly as the cylindrical moving members 52 are moved from their second positions into a third position. When the cylindrical members 52 reach their third positions, the panel assembly 20 is in its fully opened position as shown in FIG. 12.

By reversing the rotational direction of the drive gear 46 the panel assembly 20 can be moved forwardly from its fully opened position into its vent position. This movement occurs in a forward rectilinear fashion when the cylindrical members 52 are moved forwardly within the cylindrical openings 28 from their third position to their second position. As the cylindrical members 52 move from their second positions forwardly into their first positions, the panel assembly 20 is moved from the vent position shown in FIG. 11 to the closed position shown in FIG. 10. Finally, when the cylindrical members 52 are moved forwardly from their first positions into their locking positions, the C-shaped locking hooks move from their released positions shown in dotted lines in FIG. 10 into their locking positions shown in solid lines in FIG. 10.

While a mounting mechanism of the present invention has been described in the preferred embodiment as mounting the panel assembly for movement between adjacent positions in a sequence of positions which are arranged in the order of a spoiler-type sunroof assembly, the present mounting arrangement can be readily modified to accommodate a different sequence of positions such as is embodied in sunroofs of the type which shift downwardly and rearwardly in their fully opened positions. In an arrangement of this type, the curved L-shaped slots would be reversed so that the position of the panel assembly when the cylindrical moving members are disposed in the foremost position would be in the vent position. As the cylindrical moving members are moved from their first positions rearwardly the panel assembly would be moved into its closed position as the cylindrical members reach their second positions. The movement from the second position to the third position would involve a further initial downward movement of the arms as well as an initial downward movement of the forward mount so that the movement rearwardly of the initial movement would be rectilinear. With an arrangement of this type instead of pins (82) controlling the rearward longitudinal movement of the forward mount, the rearward longitudinal movement could be controlled by interengaging stop surfaces which are open at each end. It will also be understood that the mounting mechanism would be suitable to effect a simple movement of a panel assembly from a closed position into a vent open position.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:
1. A vehicle sunroof assembly comprising:
 a fixed frame assembly for securement to a vehicle roof in a position to extend alongside an opening in the roof,
 a panel assembly for closing the opening,
 a panel mounting means for mounting said panel assembly on said frame assembly for movement between adjacent panel assembly positions within a sequence of said panel assembly positions including a closed position wherein said panel assembly is supported in closing relation with the roof opening, a vent position wherein said panel assembly is tilted upwardly and rearwardly above the opening, and an open position wherein a substantial portion of said panel assembly is disposed rearwardly of the roof opening, and moving means mounted on said frame assembly for longitudinal movement between adjacent moving means positions within a sequence of corresponding said moving means positions so as to move said panel assembly between said adjacent panel assembly positions of the sequence of said panel assembly positions in re- sponse to the movement of said panel moving means between corresponding adjacent said moving means positions, said panel mounting means including longitudinally extending cam track means and arm means operatively connected with said panel assembly and said moving means in cooperating relation with said cam track means so that said arm means is moved between lowered and raised positions to effect the movement of said panel assembly between the closed and vent positions thereof during the movement of said moving means between adjacent positions corresponding to the closed and vent positions of said panel assembly;

said arm means being connected with said moving means to move longitudinally therewith through the sequence of corresponding positions of movement of said moving means, means connecting said moving means with said panel assembly and operative to move said arm means longitudinally relative to said panel assembly during movement of said panel assembly between its closed and vent positions and longitudinally with said panel assembly during movement of said panel assembly between its vent and open positions, said frame assembly including a pair of laterally spaced guide rails extending in a longitudinal direction, said cam track means including longitudinally continuous spaced surfaces defining a cam slot in each guide rail opening laterally therein, said arm means including an arm mounted with so as to extend laterally through the lateral opening of each of said guide rails, said cam slots at an intersection with the arm means opening in a generally horizontal lateral direction when said arms are in the lowered positions thereof and in a generally vertical lateral direction when said arms are in the raised positions thereof.

2. A spoiler-type vehicle sunroof assembly comprising:

a fixed frame assembly for securement to a vehicle roof in a position to extend alongside of an opening in the roof, a panel assembly for closing the opening, moving means mounted for longitudinal movement with respect to said frame assembly between locking and first positions, between first and second positions, and between second and third positions, means for mounting a forward portion of said panel assembly on said frame assembly for pivotal and longitudinal movements, a fixed locking structure fixed to a rearward portion of said panel assembly, movable panel locking means connected with said moving means for movement thereby between locking and releasing positions with respect to said fixed locking structure in response to the movement of said moving means between said locking and first positions, and panel mounting and movement effecting means operatively connected with said moving means and said panel assembly for (1) effecting movement of said panel assembly (A) from a closed position with respect to the roof opening to an upwardly and rearwardly tilted vent position above the roof opening in response to the movement of said moving means from the first position thereof to the second position thereof and (B) from the vent position into the closed position thereof in response to the movement of said moving means from the second position thereof into the first position thereof and (2) effecting movement of said panel assembly (A) from the vent position thereof into an upwardly and rearwardly tilted open position above the roof in response to the movement of said moving means from the second position thereof to the third position thereof and (B) from the open position into the vent position in response to the movement of said moving means from the third position thereof to the second position thereof, said panel mounting and movement effecting means including longitudinally extending cam track means and arm means operatively connected with said moving means and said panel assembly in cooperating relation with said cam track means so that said arm means is moved between lowered and raised positions to effect the movement of said panel assembly between the closed and vent positions thereof during the movement of said moving means between said first and second positions, said arm means being connected with said moving means to move longitudinally therewith between all of the positions of movement thereof, means connecting said arm means with said panel assembly and operative to move said arm means longitudinally relative to said panel assembly during movements with said moving means between said locking and first positions and said first and second positions and to longitudinally move said panel assembly with said arm means during movements of said arm means with said moving means between said second and third positions, said frame assembly including a pair of laterally spaced guide rails extending in a longitudinal direction, said cam track means including longitudinally continuous spaced surfaces defining a cam slot in each guide rail opening laterally therein, said arm means including an arm mounted within said cam slot so as to extend laterally through the lateral opening thereof, said cam slots opening at an intersection with the arm means in a generally horizontal lateral direction when said arms are in the lowered positions thereof and in a generally vertical lateral direction when said arms are in the raised position thereof.

3. A spoiler-type vehicle sunroof assembly comprising:

a fixed frame assembly for securement to a vehicle roof in a position to extend alongside an opening in the roof, a panel assembly for closing the opening, moving means mounted for longitudinal movement with respect to said frame assembly between first and second positions and between second and third positions, means for mounting a forward portion of said panel assembly on said frame assembly for pivotal and longitudinal movements, and panel mounting and movement effecting means operatively connecting said moving means and said panel assembly for (1) effecting movement of said panel assembly (A) from a closed position with respect to the roof opening to an upwardly and rearwardly tilted vent position above the roof opening in response to the movement of said moving means from the first position thereof to the second position thereof and (b) from the vent position into the closed position thereof in response to the movement of said moving means from the second position thereof into the first position thereof and (2) effecting movement of said panel assembly (A) from the vent position thereof into an upwardly and rearwardly tilted open position above the roof in response to the movement of said moving means from the second position thereof to the third position thereof and (B) from the open position into the vent position in response to the movement of said moving means from the third position thereof to the second position thereof, said panel mounting and movement effecting means including longitudinally extending cam track means and arm means operatively connected with said moving means and said panel assembly in cooperating relation with said cam track means so that said arm means is moved between lowered and raised positions to effect the movement of said panel assembly between the closed and vent positions thereof during the movement of said moving means between said first and second positions, said arm means being connected with said moving means to move longitudinally therewith between the first, second, and third positions of movement thereof, means connecting said arm means with said panel assembly and operative to move said arm means longitudinally relative to said panel assembly during movements of said arm means with said moving means between said first and second positions and to longitudinally move said panel assembly with said arm means during movements of said arm means with said moving means between said second and third positions, said frame assembly including a pair of laterally spaced guide rails extending in a longitudinal direction, said cam track means including longitudinally continuous spaced surfaces defining a cam slot in each guide rail opening laterally therein, said arm means including an arm mounted within said cam slot so as to extend laterally through the lateral opening thereof, said cams slots opening at an intersection with the arm means in a generally horizontal lateral direction when said arms are in the lowered positions thereof and in a generally vertical lateral direction when said arms are in the raised positions thereof.

4. A vehicle sunroof assembly comprising:

a fixed frame assembly for securement to a vehicle roof in a position to extend alongside an opening in the roof, a panel assembly for closing the opening, panel mounting means for mounting said panel assembly on said frame assembly for movement between adjacent panel assembly positions within a sequence of positions including a closed position wherein said panel assembly is supported in closing relation with the roof opening, a vent position wherein said panel assembly is tilted upwardly and rearwardly above the opening, and an open position wherein a substantial portion of said panel assembly is disposed rearwardly of the roof opening, and moving means mounted on said frame assembly for longitudinal movement between adjacent moving means positions within a sequence of corresponding positions so as to move said panel assembly between adjacent panel assembly positions of the sequence of positions thereof in response to the movement of said panel moving means between corresponding adjacent positions thereof, said panel mounting means including longitudinally extending cam track means and arm means operatively connected with said panel assembly and said moving means in cooperating relation with said cam track means so that said arm means is moved between lowered and raised positins to effect the movement to said panel assembly between the closed and vent positions thereof during the movement of said moving means between adjacent positions corresponding to the closed and vent position of said panel assembly, said arm means being connected with said moving means to move longitudinally therewith through the sequence of corresponding positions of movement to said moving means, means connecting said arm means with said panel assembly and operative to move said arm means longitudinally relative to said panel assembly during movement to said panel assembly between its closed and vent positions and longitudinally with said panel assembly during movement of said panel assembly between its vent and open positions, said frame assembly including a pair of laterally spaced guide rails extending in a longitudinal direction, said cam track means including longitudinally continuous spaced surfaces defining a cam slot in each guide rail opening laterally therein, said arm means including an arm mounted within said cam slot so as to extend laterally through the lateral openings thereof, said cam slots opening at an intersection with the arm means in a first lateral direction when said arms are in the lowered positions thereof and in a second lateral direction angularly displaced from said first lateral direction when said arms are in the raised positions thereof.

5. A spoiler-type vehicle sunroof assembly comprising:

a fixed frame assembly for securement to a vehicle roof in a position to extend alongside of an opening in the roof, a pale assembly for closing the opening, moving means mounted for longitudinal movement with respect to said frame assembly between locking and first positions, between first and second positions, and between second and third positions, means for mounting a forward portion of said panel assembly on said frame assembly for pivotal and longitudinal movements a fixed locking structure fixed to a rearward position of said panel assembly, movable panel locking means connected with said moving means for movement thereby between locking and releasing positions with respect to said fixed locking structure in response to the movement of said moving means between said locking and first positions, and panel mounting and movement effecting means operatively connected with said moving means and said panel assembly for (1) effecting movement of said panel assembly (A) from a closed position with respect tot he roof opening to an upwardly and rearwardly tilted vent position above the roof opening in response to the movement of said moving means from the first position thereof to the second position thereof and (B) from the vent position into the closed position thereof in response to the movement of said moving means from the second position thereof into the first position thereof and (2) effecting movement from of said panel assembly (A) from the vent position thereof into an upwardly and rearwardly tilted open position above the roof in response to the movement of said moving means from the second position thereof to the third position thereof and (B) from the open position into the vent position in response to the movement of said moving means from the third position thereof to the second position thereof, said panel mounting and movement effecting means including longitudinally extending cam track means and arm means operatively connected with said moving means and said panel assembly in cooperating relation with said cam track means so that said arm means is moved between lowered and raised positions to effect the movement of said panel assembly between the closed and vent positions thereof during the movement of said moving means between said first and second positions, said arm means being connected with said moving means to move longitudinally therewith between all of the positions of movement thereof, means connecting said arm means with said panel assembly and operative to move said arm means longitudinally relative to said panel assembly during movements with said moving means between said locking and first positions and said first and second positions and to longitudinally move said panel assembly with said arm means during movements of said arm means with said moving means between said second and third positions, said frame assembly including a pair of laterally spaced guide rails extending in a longitudinal direction, said cam track means including longitudinally continuous spaced surfaces defining a cam slot in each guide rail opening laterally therein, said arm means including an arm mounted within said cam slot so as to extend laterally through the lateral opening thereof, said cam slots opening at an intersection with the arm means in a first direction when said arms are in the lowered positions thereof and in a second lateral direction angularly displaced from said first lateral direction when said arms in the raised positions thereof.

6. A spoiler-type vehicle sunroof assembly comprising:

a fixed frame assembly for securement to a vehicle roof in a position to extend alongside an opening in the roof, a panel assembly for closing the opening, moving means mounted for longitudinal movement with respect to said frame assembly between first and second positions and between second and third positions, means for mounting a forward portion of said panel assembly on said frame assembly for pivotal and longitudinal movements, and panel mounting and movement effecting means operatively connecting said moving means and said panel assembly for (1) effecting movement of said panel assembly (A) from a closed position with respect to the roof opening to an upwardly and rearwardly tilted vent position above the roof opening in response to the movement of said moving means from the first position thereof to the second position thereof and (B) from the vent position into the closed position thereof in response to the movement of said moving means from the second position thereof into the first position thereof and (2) effecting movement of said panel assembly (A) from the vent position thereof into an upwardly and rearwardly tilted open position above the roof in response to the movement of said moving means from the second position thereof to the third position thereof and (B) from the open position into the vent position in response to the movement of said moving means from the third position thereof to the second position thereof, said panel mounting and movement effecting means including longitudinally extending cam track means and arm means operatively connected with said moving means and said panel assembly in cooperating relation with said cam track means so that said arm means is moved between lowered and raised positions to effect the movement of said panel assembly between the closed and vent positions thereof during the movement of said moving means between said first and second positions, said arm means being connected with said moving means to move longitudinally therewith between the first, second and third positions of movement thereof, means connecting said arm means with said panel assembly and operative to move said arm means longitudinally relative to said panel assembly during movements of said arm means with said moving means between said first and second positions and to longitudinally move said panel assembly with said arm means during movements of said arm means with said moving means between said second and third positions, said frame assembly including a pair of laterally spaced guide rails extending in a longitudinal direction, said cam track means including longitudinally continuous spaced surfaces defining a cam slot in each guide rail opening laterally therein, said arm means including an arm mounted within said cam slot so as to extend laterally through the lateral opening thereof, said cam slots opening at an intersection with the arm means in a first lateral direction when said arms in the lowered positions thereof and in a second lateral direction angularly displaced from said first lateral direction when said arms are in the raised positions thereof.

7. A sunroof assembly as defined in claim 1 wherein said panel assembly includes a pair of laterally spaced fixed plates, a slide member pivotally mounted on a laterally outwardly extending end of each arm, and a curved slot in each fixed plate slidably receiving an associated said slide member, said curved slots being shaped such that said slide members slide within the curved slots (1) in a generally longitudinal direction when said arms move from the lowered positions thereof toward the raised positions thereof and (2) in a generally lateral direction when said arms move from the raised positions thereof toward the lowered positions thereof.

8. A sunroof assembly as defined in claim 7 wherein each of said cam slots opens laterally inwardly into a cylindrical opening extending longitudinally within the associated guide rail in coextensive relation with the associated cam slot, said moving means including a cylindrical member mounted within each cylindrical opening for both longitudinal and rotational movement with respect to the associated guide rail.

9. A sunroof assembly as defined in claim 8 wherein the panel assembly is generally planar, each of said arms includes an inner end portion to the associated cylindrical member an intermediate portion extending outwardly from the associated cylindrical member in coextensive relation with the associated cam slot and an outer end portion pivoted to said slide member about an axis which is parallel with a plane of said panel assembly at all times, each of said arms intermediate portions including a leading flat surface intersecting a trailing curved surface and a trailing flat surface parallel with said leading flat surface intersecting a leading curved surface spaced with respect to said trailing curved surface.

10. A sunroof assembly as defined in claim 2 wherein said panel assembly includes a pair of laterally spaced fixed plates, said panel mounting and movement effecting means including means for connecting each of said arms with said panel assembly including a slide member pivotally mounted on a laterally outwardly extending end of each arm, and a curved slot in each fixed plate slidably receiving an associated said slide member, said curved slots being shaped such that said slide members slide within the curved slots (1) in a generally longitudinal direction when said arms move from the lowered positions thereof toward the raised positions thereof and (2) in a generally lateral direction when said arms move from the raised positions thereof toward the lowered positions thereof.

11. A sunroof assembly as defined in claim 10 wherein each of said cam slots opens laterally inwardly into a cylindrical opening extending longitudinally within the associated guide rail in coextensive relation with the associated cam slot, said moving means including a cylindrical member mounted within each cylindrical opening for both longitudinal and rotational movement with respect to the associated guide rail.

12. A sunroof assembly as defined in claim 11 wherein each of said arms includes an inner end portion fixed to the associated cylindrical member and an intermediate portion extending outwardly from the associated cylindrical member in coextensive relation with the associated cam slot, each of said arms intermediate portions including a leading flat surface intersecting a trailing curved surface and a trailing flat surface parallel with said leading flat surface intersecting a leading curved surface spaced with respect to said trailing curved surface, each of said cam slots being defined by (1) parallel flat surfaces guidingly engaged by the parallel leading and trailing flat surfaces of the associated arm intermediate portion during the movement of said moving means between the locking and first positions thereof and between the second and third positions thereof and (2) spaced curved surfaces guidingly engaged by the leading and trailing curved surfaces of the associated arms intermediate portion during the movement of said moving means between the first and second positions thereof.

13. A sunroof assembly as defined in claim 12 wherein said forward panel mounting means includes a pair of laterally spaced mounting members pivoted to said panel assembly along a transversely extending axis disposed forwardly and downwardly of a forward edge of the roof opening when said panel assembly is int he closed position thereof, said guide rails having parallel grooves slidably receiving said mounting members for longitudinal movements therein, means acting between said mounting members and said guide rails for controlling the movement of said panel assembly in a forward longitudinal direction during the movement of said moving means from the second position thereof into the first position thereof and from the first position thereof into the locking position thereof, and means acting between said fixed plates and said guide rails for controlling the movement of said panel assembly in a rearward longitudinal direction during the movement of said moving means from the locking position thereof into the first position thereof and from the first position thereof into the second position thereof.

14. A sunroof assembly as defined in claim 13 wherein said movable locking means includes a forwardly opening locking hook mounted for movement within a rearward portion of each cam slot between locking and releasing positions during the movement of said panel-moving means between the locking and first positions thereof, said fixed locking structure including a pair of rearwardly facing locking elements shaped and positioned to be within said cam slots forwardly of the associated locking hooks when said panel assembly is in the closed position thereof, said locking hooks being mounted for movement (1) forwardly from said releasing position into said locking position in locking relation with said locking elements when said moving means moves from the first position thereof into the locking position thereof, and (2) rearwardly from said locking position into said releasing position when said moving means moves from the locking position thereof to the first position thereof.

15. A sunroof assembly as defined in claim 14 wherein said moving means further includes a helical-toothed cable connected in aligned relation with a forward end of each cylindrical member, tubes guiding said helical-toothed cables for movement therein in predetermined paths which extend laterally in parallel relation through a driving station and a driving gear at said driving station between the laterally parallel paths of said tubes in meshing relation with the helical-toothed cables therein.

16. A sunroof assembly as defined in claim 2 wherein said forward panel mounting means includes a pair of laterally spaced mounting members pivoted to said panel assembly along a transversely extending axis disposed forwardly and downwardly of a forward edge of the roof opening when said panel assembly is in the closed position thereof, said guide rails having parallel grooves slidably receiving said mounting members for longitudinal movements therein, and means acting between said mounting members and said guide rails for controlling the movement of said panel assembly in a forward longitudinal direction during the movement of said moving means from the second position thereof into the first position thereof and from the first position thereof into the locking position thereof, and means acting between said panel assembly and said guide rails for controlling the movement of said panel assembly in a rearward longitudinal direction during the movement of said moving means from the locking position thereof into the first position thereof and from the first position thereof into the second position thereof.

17. A sunroof assembly as defined in claim 2 wherein said movable locking means includes a forwardly opening locking hook mounted for movement within a rearward portion of each cam slot between locking and releasing positions during the movement of said panel-moving means between the locking and first positions thereof, said fixed locking structure including a pair of rearwardly facing locking elements shaped and positioned to be within said cam slots forwardly of the associated locking hooks when said panel assembly is in the closed position thereof, said locking hooks being mounted for movement (1) forwardly from said releasing position into said locking position in locking relation with said locking elements when said moving means moves from the first position thereof into the locking position thereof, and (2) rearwardly from said locking position into said releasing position when said moving means moves from the locking position thereof to the first position thereof.

18. A sunroof assembly as defined in claim 11 wherein said moving means further includes a helical-toothed cable connected in aligned relation with a forward end of each cylindrical member, tubes guiding said helical-toothed cables for movement therein in predetermined paths which extend laterally in parallel relation through a driving station and a driving gear at said driving station between the laterally parallel paths of said tubes in meshing relation with the helical-toothed cables therein.

19. A sunroof assembly as defined in claim 3 wherein said panel assembly includes a pair of laterally spaced fixed plates, said panel mounting and movement effecting means including means for connecting each of said arms with said panel assembly including a slide member pivotally mounted on a laterally outwardly extending end of each arm, and a curved slot in each fixed plate slidably receiving an associated slide member, said curved slots being shaped such that said slide members slide within the curved slots (1) in a generally longitudinal direction when said arms move from the lowered positions thereof toward the raised positions thereof and (2) in a generally lateral direction when said arms move from the raised positions thereof toward the lowered positions thereof.

20. A sunroof assembly as defined in claim 19 wherein each of said cam slots opens laterally inwardly into a cylindrical opening extending longitudinally within the associated guide rail in coextensive relation with the associated cam slot, said moving means including a cylindrical member mounted within each cylindrical opening for both longitudinal and rotational movement with respect to the associated guide rail.

21. A sunroof assembly as defined in claim 20 wherein each of said arms includes an inner end portion fixed to the associated cylindrical member and an intermediate portion extending outwardly from the associated cylindrical member in coextensive relation with the associated cam slot, each of said arm intermediate portions including a leading flat surface intersecting a trailing curved surface and a trailing flat surface parallel with said leading flat surface intersecting a leading curved surface spaced with respect to said trailing curved surface, each of said cam slots being defined by (1) parallel flat surfaces guidingly engaged by the parallel leading and trailing flat surfaces of the associated arm intermediate portion during the movement of said moving means between the second and third positions thereof and (2) spaced curved surfaces guidingly engaged by the leading and trailing curved surfaces of the associated arm intermediate portion during the movement of said moving means between the first and second positions thereof.

22. A sunroof assembly as defined in claim 21 wherein said forward panel mounting means includes a pair of laterally spaced mounting members pivoted to said panel assembly along a transversely extending axis disposed forwardly and downwardly of a forward edge of the roof opening when said panel assembly is in the closed position thereof, said guide rails having a parallel grooves slidably receiving said mounting members for longitudinal movements therein, and means acting between said mounting members and said guide rails for controlling the movement of said panel assembly in a forward longitudinal direction during the movement of said moving means from the second position thereof into the first position thereof, and means acting between said fixed plates and said guide rails for controlling the movement of said panel assembly in a rearward longitudinal direction during the movement of said moving means from the first position thereof into the second position thereof.

23. A sunroof assembly as defined in claim 22 wherein said moving means further includes a helical-toothed cable connected in aligned relation with a forward end of each cylindrical member, tubes guiding said helical-toothed cables for movement therein in predetermined paths which extend laterally in parallel relation through a driving station and a driving gear at said driving station between the laterally parallel paths of said tubes in meshing relation with the helical-toothed cables therein.

24. A sunroof assembly as defined in claim 20 wherein each of said guide rails includes an extrusion formed with said cylindrical opening extending therethrough and with a straight slot opening laterally upwardly therefrom, a bar fixed in a forward portion of said straight slot, said extrusion and said bar having said cam slots milled forwardly therethrough between said cylindrical openings and the lateral exterior thereof which curves from an upward direction into a generally horizontal direction and terminates rearwardly of the forward end of said extrusion.

* * * * *

UNITED STATES PATENT AND TRADEMARK OFFICE
CERTIFICATE OF CORRECTION

PATENT NO. : 5,228,743
DATED : July 20, 1993
INVENTOR(S) : Otto Regner

It is certified that error appears in the above-indentified patent and that said Letters Patent is hereby corrected as shown below:

```
Column 4,  line 16 delete "-" between "portion" and "of"
Column 4,  line 35 change "ar" to --arm--
Column 9,  line 31 change "with" to --within--
Column 12, line 11 change "positins" to --positions--
Column 12, line 12 change "to" to --of--
Column 12, line 20 change "to" to --of--
Column 12, line 24 change "to" to --of--
Column 12, line 65  change "tot he" to --to the--
Column 15, line 6 after "portion" insert --fixed--
Column 15, line 67 change "int he" to --in the--
Column 18, line 51 change "openings" to --opening--
```

Signed and Sealed this

Eighth Day of March, 1994

Attest:

BRUCE LEHMAN

Attesting Officer    Commissioner of Patents and Trademarks